United States Patent
Yasuma

(10) Patent No.: US 10,506,080 B2
(45) Date of Patent: Dec. 10, 2019

(54) COMMUNICATION APPARATUS, COMMUNICATION SYSTEM, INFORMATION PROCESSING METHOD, AND STORAGE MEDIUM

(71) Applicant: CANON KABUSHIKI KAISHA, Tokyo (JP)

(72) Inventor: Kensuke Yasuma, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 232 days.

(21) Appl. No.: 14/864,517

(22) Filed: Sep. 24, 2015

(65) Prior Publication Data

US 2016/0094686 A1 Mar. 31, 2016

(30) Foreign Application Priority Data

Sep. 26, 2014 (JP) .................................. 2014-197319

(51) Int. Cl.
- H04L 29/06 (2006.01)
- H04L 29/08 (2006.01)
- H04W 76/10 (2018.01)

(52) U.S. Cl.
CPC .............. H04L 69/18 (2013.01); H04L 67/02 (2013.01); H04W 76/10 (2018.02)

(58) Field of Classification Search
CPC ............ G06Q 20/3224; G06Q 30/0267; H04L 67/02; H04L 67/16; H04L 67/306; H04L 67/1008; H04L 67/1014; H04L 67/14; H04L 67/327; H04L 69/16; H04L 69/161; H04L 69/163; H04L 63/0428; H04L 63/166; H04L 69/22; H04L 67/2823; H04L 67/42; H04L 67/2828; H04L 69/08;
(Continued)

(56) References Cited

U.S. PATENT DOCUMENTS 5,991,795 A * 11/1999 Howard ................. H04L 29/06
    709/201
5,999,213 A * 12/1999 Tsushima ............... H04N 5/232
    348/180

(Continued)

FOREIGN PATENT DOCUMENTS

| JP | 2000-299774 A | 10/2000 |
|---|---|---|
| JP | 2004-363993 A | 12/2004 |
| JP | 2014-160363 | * 8/2014 |

Primary Examiner — Jason D Recek
Assistant Examiner — Ranjan Pant
(74) Attorney, Agent, or Firm — Canon U.S.A., Inc. IP Division

(57) ABSTRACT

A communication apparatus includes a designation unit configured to designate a connection-destination communication apparatus, a determination unit configured to determine, based on whether identification information about the connection-destination communication apparatus designated by the designation unit is registered, whether to skip protocol switching processing for switching from a first communication protocol to a second communication protocol, and an execution unit configured to execute the protocol switching processing to switch from the first communication protocol to the second communication protocol in a case where the determination unit determines not to skip the protocol switching processing.

17 Claims, 9 Drawing Sheets

(58) Field of Classification Search
CPC . H04L 67/26; H04L 67/2852; H04L 12/4633; H04L 49/3009; H04L 69/18; H04L 65/1069; H04L 29/06; H04L 61/2007; H04L 45/745; H04L 47/125; H04L 61/6022; H04L 63/164; H04L 69/167; H04L 29/06068; H04N 21/43615; H04N 21/44227; H04N 21/4622; G06F 9/5027; G06F 2209/5016

See application file for complete search history.

(56) References Cited

U.S. PATENT DOCUMENTS

| | | | | |
|---|---|---|---|---|
| 6,567,122 | B1* | 5/2003 | Anderson | H04N 1/00204 348/14.01 |
| 6,857,009 | B1* | 2/2005 | Ferreria | H04L 69/163 370/401 |
| 7,340,766 | B2* | 3/2008 | Nagao | H04N 1/00204 348/207.11 |
| 7,395,338 | B2* | 7/2008 | Fujinaga | H04L 67/42 709/203 |
| 7,428,005 | B2* | 9/2008 | Creamer | H04N 1/00214 348/211.3 |
| 7,447,221 | B2* | 11/2008 | Namihira | H04L 12/4633 370/392 |
| 8,176,305 | B2* | 5/2012 | Yamaji | G06F 9/4403 710/302 |
| 8,230,472 | B2* | 7/2012 | Bund | H04L 63/0263 348/207.1 |
| 8,244,179 | B2* | 8/2012 | Dua | H04M 1/7253 455/41.2 |
| 8,898,236 | B2* | 11/2014 | Kanakadandi | G06F 16/219 709/205 |
| 9,088,535 | B1* | 7/2015 | Baird | G06Q 10/107 |
| 9,118,717 | B2* | 8/2015 | Kahol | H04L 69/16 |
| 9,203,684 | B1* | 12/2015 | Belshe | H04L 29/06 |
| 9,723,069 | B1* | 8/2017 | Fallows | H04L 67/1036 |
| 9,813,375 | B2* | 11/2017 | Tanaka | H04W 4/70 |
| 2002/0135794 | A1* | 9/2002 | Rodriguez | H04N 1/00132 358/1.15 |
| 2002/0188743 | A1* | 12/2002 | Schaffrath | H04L 29/06 709/230 |
| 2005/0060427 | A1* | 3/2005 | Phillips | H04L 67/1008 709/238 |
| 2005/0138041 | A1* | 6/2005 | Alcorn | G06F 9/465 |
| 2005/0146610 | A1* | 7/2005 | Creamer | H04N 1/00214 348/207.1 |
| 2006/0015724 | A1* | 1/2006 | Naftali | H04L 63/0823 713/168 |
| 2006/0031902 | A1* | 2/2006 | Creamer | H04N 1/00214 725/105 |
| 2006/0244986 | A1* | 11/2006 | Ferlitsch | G06F 3/1204 358/1.13 |
| 2008/0118005 | A1* | 5/2008 | Yasuma | H04L 29/12528 375/316 |
| 2010/0257576 | A1* | 10/2010 | Valente | H04L 41/0266 726/1 |
| 2011/0078437 | A1* | 3/2011 | Reddy | H04L 63/0815 713/155 |
| 2011/0119323 | A1* | 5/2011 | Tani | H04L 67/04 709/203 |
| 2011/0145426 | A1* | 6/2011 | Miyajima | H04L 63/0272 709/230 |
| 2011/0151944 | A1* | 6/2011 | Morgan | H04W 52/0258 455/574 |
| 2013/0227272 | A1* | 8/2013 | Cox | H04L 63/205 713/151 |
| 2013/0297814 | A1* | 11/2013 | Annamalaisami | H04L 69/08 709/230 |
| 2013/0298209 | A1* | 11/2013 | Targali | H04L 63/0815 726/6 |
| 2013/0332584 | A1* | 12/2013 | Sun | H04L 61/251 709/219 |
| 2014/0029495 | A1* | 1/2014 | Ise | H04W 52/0222 370/311 |
| 2014/0122578 | A1 | 5/2014 | Lee | |
| 2014/0122728 | A1* | 5/2014 | Arima | H04L 29/12783 709/227 |
| 2015/0373048 | A1* | 12/2015 | Siddiqui | H04W 12/08 713/151 |
| 2017/0026481 | A1* | 1/2017 | Stephan | H04L 67/2814 |
| 2017/0078925 | A1* | 3/2017 | Widebrant | H04W 36/0022 |
| 2017/0163622 | A1* | 6/2017 | Asano | H04L 9/32 |

* cited by examiner

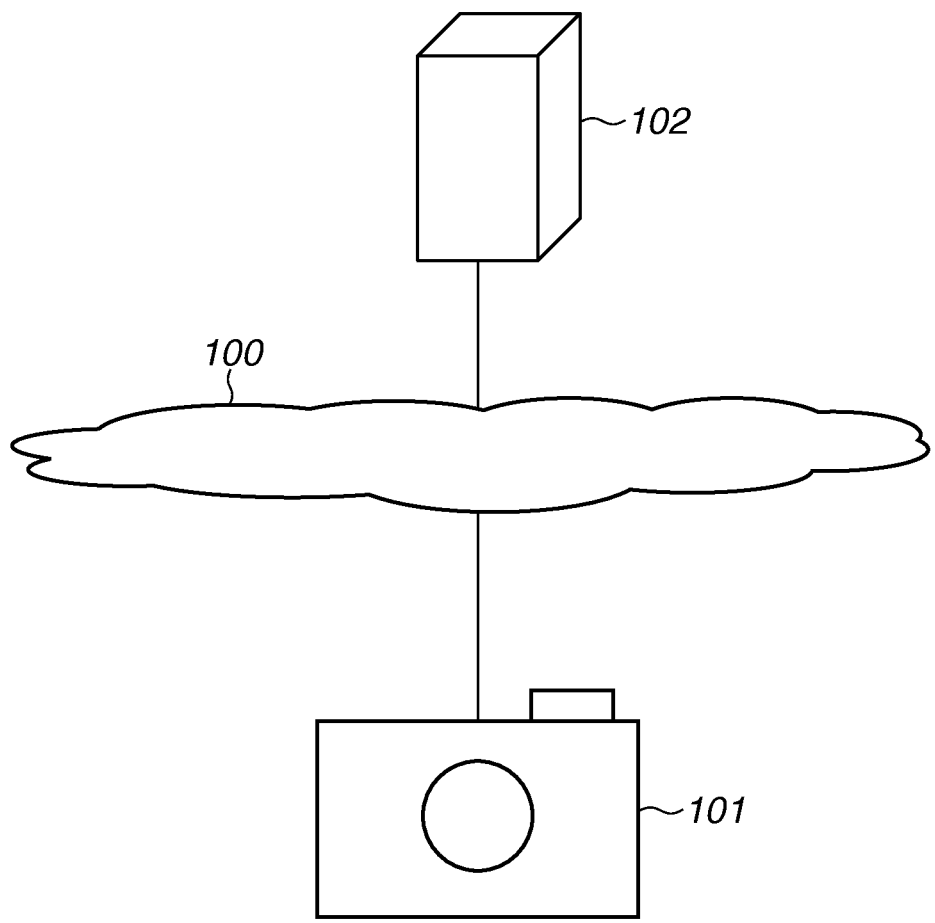

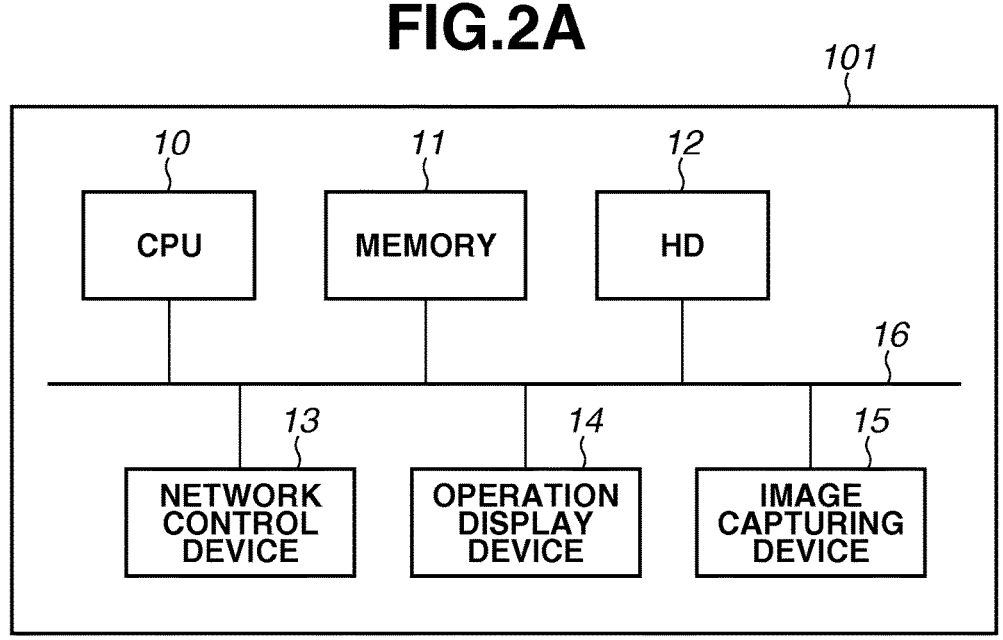
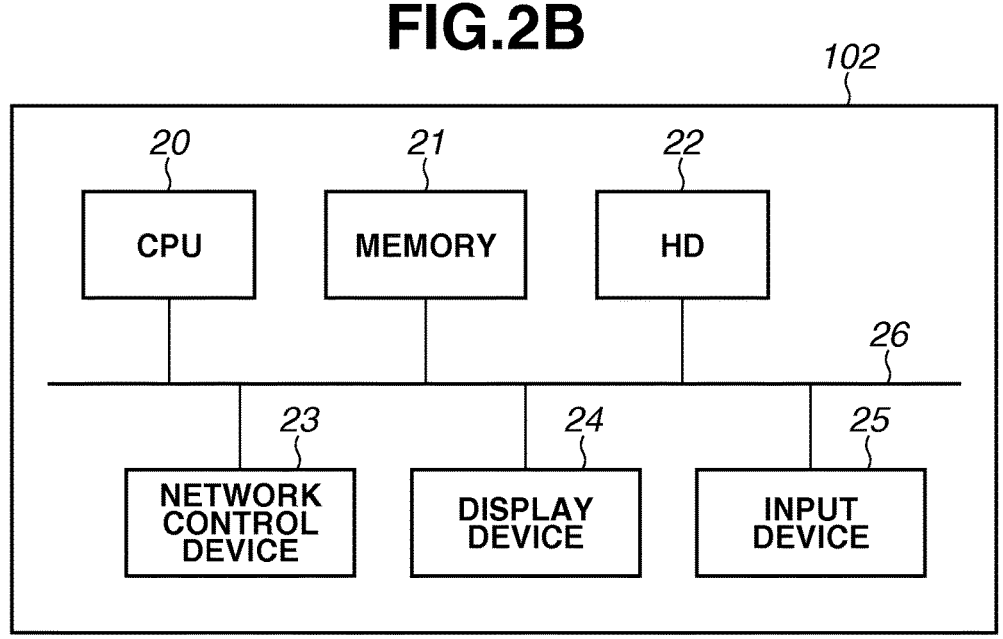

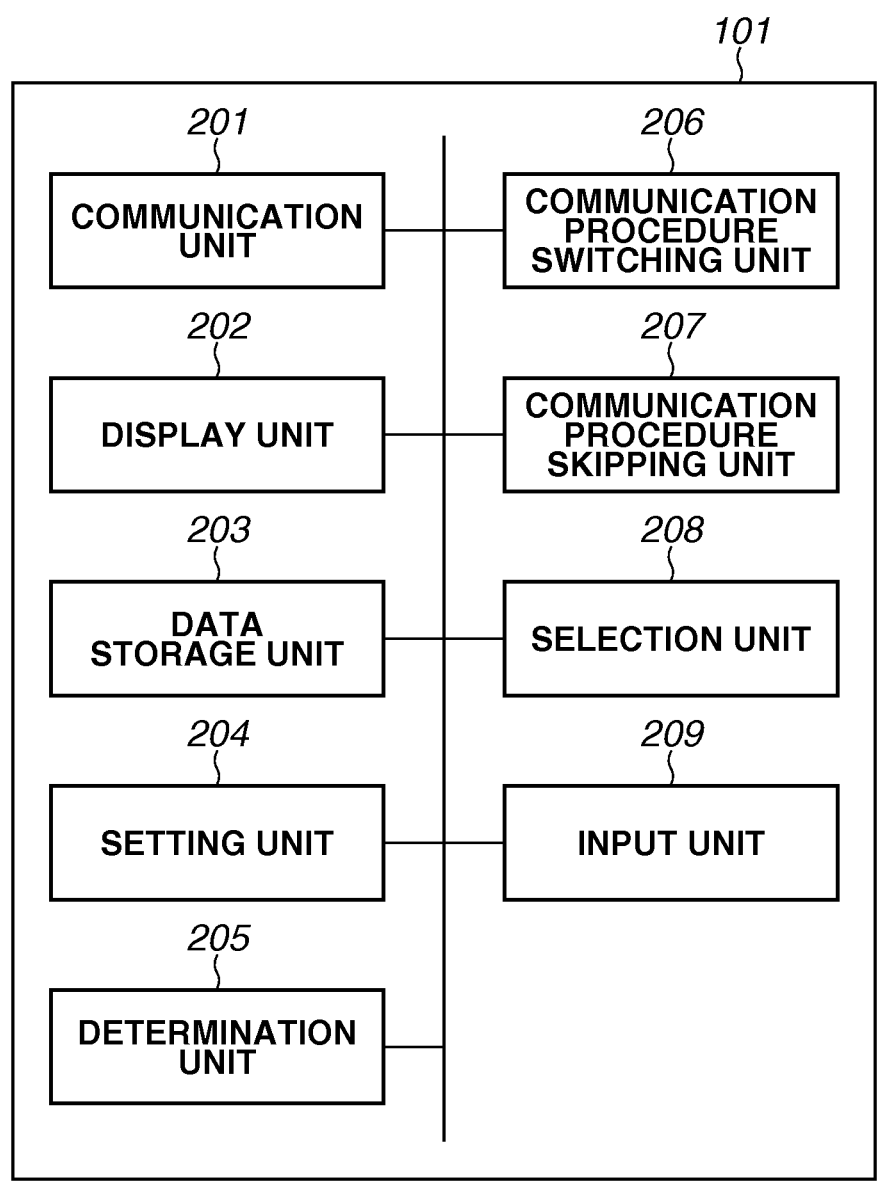

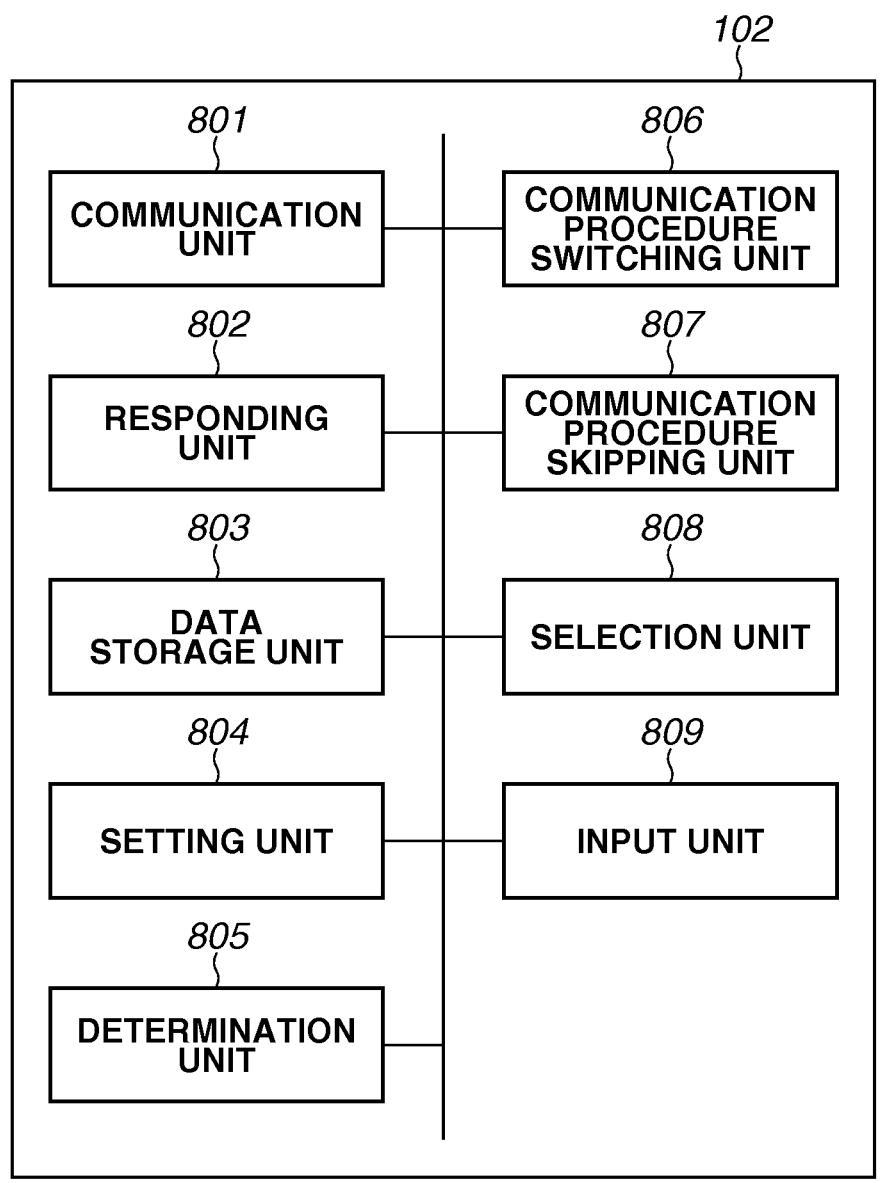

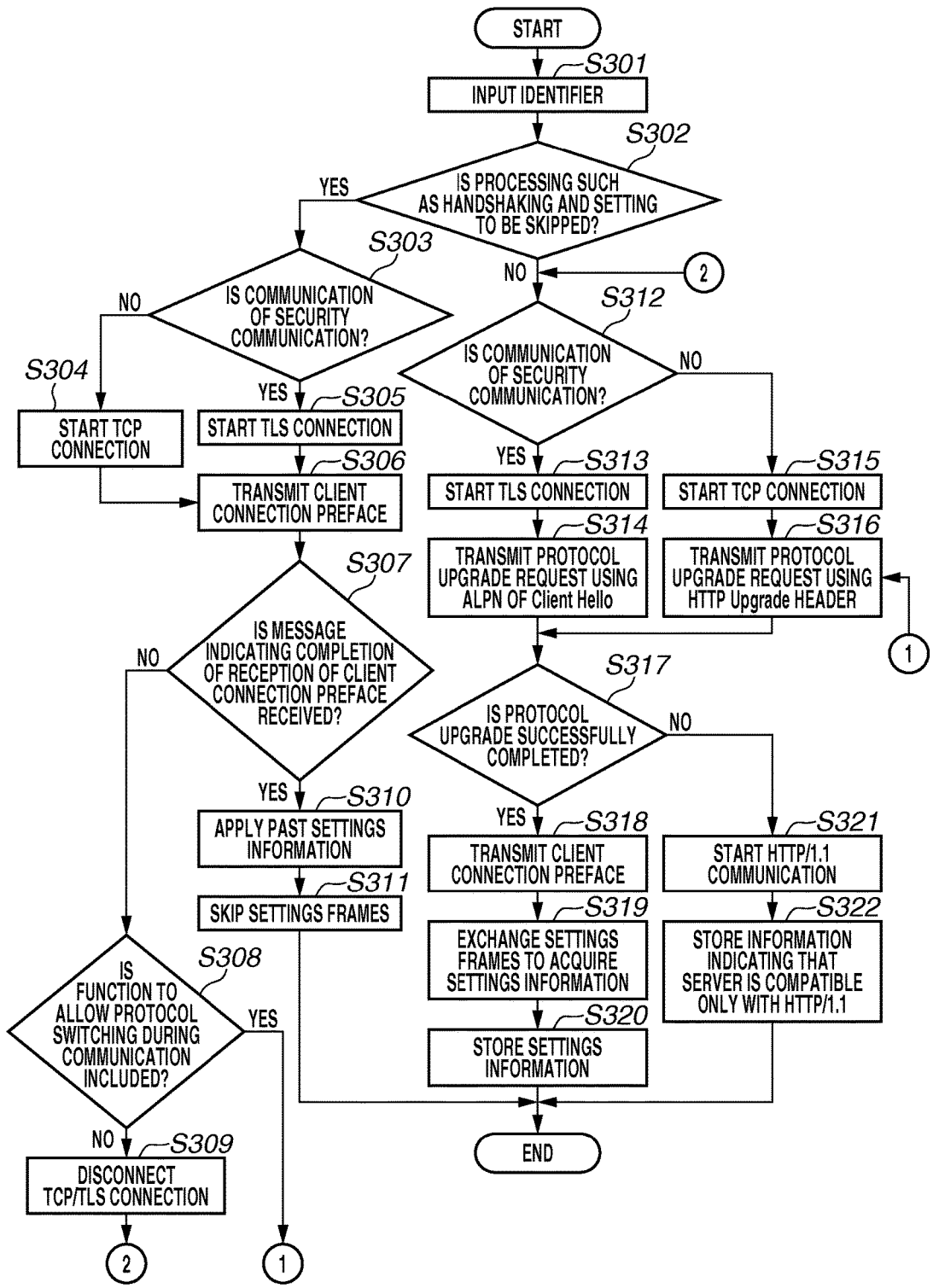

FIG.8

| IDENTIFIER OF SERVER (session id, IP/Port, URI) | SETTINGS INFORMATION (HEADER TABLE SIZE, INFORMATION INDICATING WHETHER SERVER PUSH IS ENABLED/DISABLED, MAXIMUM NUMBER OF STREAMS, INITIAL WINDOW SIZE, DATA COMPRESSION, HEADER COMPRESSION DICTIONARY INFORMATION) |
|---|---|
| 6d f3 02 8a 44 a7 42 94 14 7b 59 ad 8f 00 32 71 e9 a5 d1 bc 3f c0 23 0c 50 fa 4f 9f 27 cf 45 c4 (session id) | HEADER TABLE SIZE: 4096 byte<br>SERVER PUSH: ENABLED<br>MAXIMUM NUMBER OF STREAMS: 100<br>INITIAL WINDOW SIZE: 65535<br>DATA COMPRESSION: DISABLED<br>HEADER COMPRESSION DICTIONARY:<br>    DICTIONARY NUMBER 1<br>CIPHER COMMUNICATION: ENABLED |
| 200.100.100.1:8080 (IP/Port) | HEADER TABLE SIZE: 8192 byte<br>SERVER PUSH: DISABLED<br>MAXIMUM NUMBER OF STREAMS: 1000<br>INITIAL WINDOW SIZE: 655350<br>DATA COMPRESSION: ENABLED<br>HEADER COMPRESSION DICTIONARY:<br>    DICTIONARY NUMBER 2<br>CIPHER COMMUNICATION: DISABLED |
| www.canon-sample.com (URI) | HEADER TABLE SIZE: 4096 byte<br>SERVER PUSH: DISABLED<br>MAXIMUM NUMBER OF STREAMS: 200<br>INITIAL WINDOW SIZE: 65535<br>DATA COMPRESSION: ENABLED<br>HEADER COMPRESSION DICTIONARY:<br>    DICTIONARY NUMBER 3<br>CIPHER COMMUNICATION: ENABLED |

COMMUNICATION APPARATUS, COMMUNICATION SYSTEM, INFORMATION PROCESSING METHOD, AND STORAGE MEDIUM

BACKGROUND

Technical Field

The present disclosure relates to a communication apparatus, a communication system, an information processing method, and a storage medium.

Description of the Related Art

As a result of the reduction in device size and widespread use of wireless local area networks (LAN), various types of devices are connected to networks today. Further, it has become common to connect a device to another device, a device to a server, and a device to a cloud.

In such a circumstance, there are cases where a device carried by a user is disconnected from a network when the device is carried out of a wireless LAN area, and cases where a device is disconnected from a network when, for example, the mode of the device is changed or the power of the device is turned off.

In such cases, there arises a problem that processing to be performed at the start of communication needs to be executed every time. Japanese Patent Application Laid-Open No. 2004-363993 discusses a method in which service information is acquired through a previous negotiation procedure to skip a negotiation procedure.

However, in a communication apparatus or the like that switches a protocol to use at the time of the start of communication, processing to exchange protocol setting information needs to be executed again to reconnect, etc. This causes a problem that it takes time to establish a connection.

SUMMARY

According to an aspect of the present invention, a communication apparatus includes a designation unit configured to designate a connection-destination communication apparatus, a determination unit configured to determine, based on whether identification information about the connection-destination communication apparatus designated by the designation unit is registered, whether to skip protocol switching processing for switching from a first communication protocol to a second communication protocol, an execution unit configured to execute the protocol switching processing to switch from the first communication protocol to the second communication protocol in a case where the determination unit determines not to skip the protocol switching processing, and a transmission unit configured to transmit, in a case where the determination unit determines to skip the protocol switching processing, a connection start request based on the second communication protocol to the connection-destination communication apparatus without executing the protocol switching processing, or transmit, in a case where the determination unit determines not to skip the protocol switching processing, the connection start request based on the second communication protocol to the connection-destination communication apparatus after the protocol switching processing is executed.

Further features of the present invention will become apparent from the following description of exemplary embodiments with reference to the attached drawings.

BRIEF DESCRIPTION OF THE DRAWINGS

FIG. 1 is a diagram illustrating an example of a system configuration of a communication system.

FIGS. 2A and 2B are block diagrams illustrating examples of hardware configurations of a communication apparatus and a server, respectively.

FIG. 3 is a block diagram illustrating an example of a software configuration of a communication apparatus.

FIG. 4 is a block diagram illustrating an example of a software configuration of a server.

FIG. 5 is a flow chart illustrating an example of information processing to be performed when a communication apparatus starts communication with a server.

FIG. 8 is a table illustrating an entry of setting information of a communication apparatus.

DESCRIPTION OF THE EMBODIMENTS

Figure 6:
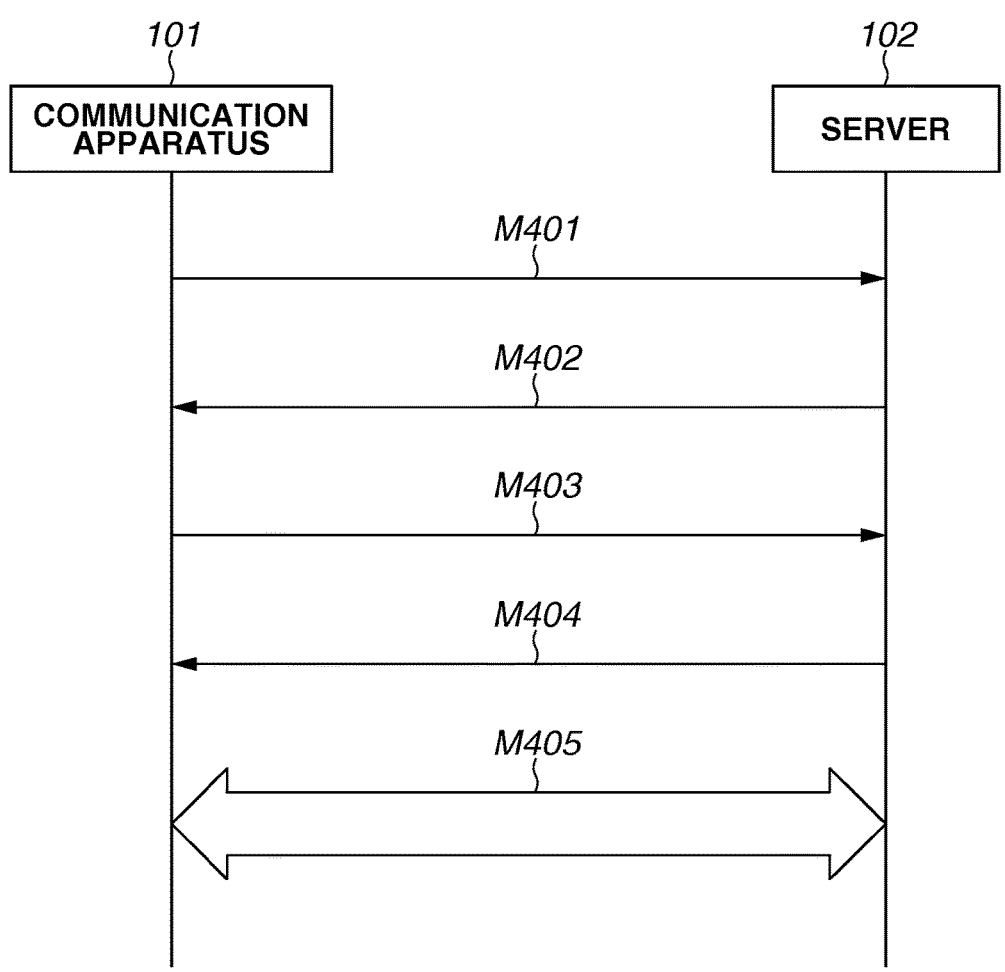
FIG. 6 is a sequence diagram illustrating an example of information processing to be performed in a case where the communication setting between a communication apparatus and a server is skipped.

Various exemplary embodiments will be described below with reference to the drawings.

FIG. 1 is a diagram illustrating an example of a system configuration of a communication system.

In the communication system, a communication apparatus 101 and a server 102 are communicably connected to each other via a network 100. The network 100 according to a first exemplary embodiment may be a combination of the Internet, a wide area network (WAN), a local area network (LAN), and the like.

The communication apparatus 101 performs the Hypertext Transfer Protocol version 1.1 (HTTP/1.1) communication and the Hypertext Transfer Protocol version 2 (HTTP/2) communication with the server 102 via the network 100. Examples of the communication apparatus 101 include a digital camera, etc. The examples, however, are not intended to limit the scope of the present exemplary embodiment. The communication apparatus 101 is an example of a connection request source communication apparatus and a first communication apparatus. Further, the server 102 is an example of a connection destination communication apparatus and a second communication apparatus.

FIGS. 2A and 2B are diagrams each illustrating an example of a hardware configuration of the communication apparatus, etc.

More specifically, FIG. 2A illustrates an example of a hardware configuration of the communication apparatus 101. FIG. 2B illustrates an example of a hardware configuration of the server 102.

As illustrated in FIG. 2A, the communication apparatus 101 includes, as hardware components, a central processing unit (CPU) 10, a memory 11, a hard disk (HD) 12, a network control device 13, an operation display device 14, and an image capturing device 15. The hardware components are connected to one another via a bus 16.

The CPU 10 is a control unit configured to control the entire communication apparatus 101. The CPU 10 executes processing based on a program stored in the memory 11, the HD 12, and the like to realize a software configuration of the communication apparatus 101 and processing in a flow chart to be performed by the communication apparatus 101, which will be described below. The memory 11 stores a boot program, predetermined data used in execution of processing by the CPU 10, and the like. The HD 12 stores a program, data used in execution of processing by the CPU 10, image data, and the like. The network control device 13 connects the communication apparatus 101 to the network 100 to control communication with other devices via the network 100 based on the control by the CPU 10. The operation display device 14 displays image data and the like, receives user an operation, and notifies the CPU 10 of operation information about the received operation, based on the control by the CPU 10. The image capturing device 15 controls the image capturing based on the control by the CPU 10. The hardware configuration illustrated in FIG. 2A is an example of a case where the communication apparatus 101 is a digital camera.

Further, as illustrated in FIG. 2B, the server 102 includes, as hardware components, a CPU 20, a memory 21, a HD 22, a network control device 23, a display device 24, and an input device 25. The hardware components are connected to one another via a bus 26.

The CPU 20 is a control unit configured to control the entire server 102. The CPU 20 executes processing based on a program stored in the memory 21, the HD 22, or the like to realize a software configuration of the server 102 and processing in a flow chart to be performed by the server 102, which will be described below. The memory 21 stores a boot program, predetermined data used in execution of processing by the CPU 20, or the like. The HD 22 stores a program, data used in execution of processing by the CPU 20, or the like. The network control device 23 connects the server 102 to the network 100 to control communication with other devices via the network 100 based on the control by the CPU 20. The display device 24 displays data based on the control by the CPU 20. The input device 25 receives a user operation, and notifies the CPU 20 of operation information about the received operation.

FIG. 3 is a block diagram illustrating an example of a software configuration of the communication apparatus 101.

A communication unit 201 performs the Transmission Control Protocol over the Internet Protocol (TCP/IP) processing and transport layer security (TLS) processing.

A display unit 202 performs the display of connection completion and connection error. The display unit 202 performs the display using the operation display device 14. While the communication apparatus 101 may display the connection completion and connection error, it is not limited thereto, and event information may be notified to the user by use of sound, vibration, or the like.

A data storage unit 203 stores and manages setting information (refer to FIG. 8 described below) associated with an identifier of a server in the HD 12, or the like. While a description is given in the present exemplary embodiment assuming that information illustrated in FIG. 8 is stored in the communication apparatus 101. However, it is not limited thereto, and the communication apparatus 101 may refer to and use information registered on other apparatuses connected via a network. The identifier of the server is an example of identification information for identifying a communication apparatus (server) which is a connection destination.

A setting unit 204 sets communication parameters based on the setting information stored in the data storage unit 203.

A determination unit 205 determines whether to set the stored setting information based on a designated identifier. Further, the determination unit 205 determines whether the communication is of a security communication and also determines whether a setting phase can be skipped.

A communication procedure switching unit 206 switches between HTTP/1.1 communication and HTTP/2 communication.

A communication procedure skipping unit 207 skips a handshake and a setting procedure to be performed at the start of communication.

A selection unit 208 selects a protocol from HTTP/1.1 and HTTP/2.

An input unit 209 inputs an identifier such as a universal resource identifier (URI), an Internet protocol (IP) address and a port number, a session identifier (ID). The input unit 209 may input an identifier according to a user operation performed via a user interface (UI) displayed on the operation display device 14, or the like or may input an identifier acquired from another apparatus by use of near field communication (NFC), Bluetooth (registered trademark), or the like. Further, the input unit 209 may receive an identifier stored in an application or the like of the communication apparatus 101 from the application or the like and input the received identifier.

While in the present exemplary embodiment, description is given assuming that HTTP/1.1 and HTTP/2 are used as examples of protocols, they are not limited thereto, and SPDY or Quick User Datagram Protocol Internet Connections (QUIC) may also be used. Further, other different protocols may be switched therebetween. HTTP/1.1 is an example of a first communication protocol. HTTP/2 is an example of a second communication protocol.

FIG. 4 is a block diagram illustrating an example of a software configuration of the server 102.

A communication unit 801 performs TCP/IP processing and TLS processing.

A responding unit 802 transmits a reception message in response to a communication switching. In a case where the communication switching method is the client connection preface, the responding unit 802 transmits HTTP 200 OK. Further, in a case where the communication switching method is the HTTP/1.1 Upgrade header, the responding unit 802 transmits HTTP 101 Switching Protocols. In a case where the communication switching method is a Client Hello with the TLS application-layer protocol negotiation (ALPN) extension (TLS-ALPN) field, the responding unit 802 transmits Server Hello with TLS-ALPN.

A data storage unit 803 stores and manages setting information associated with the identifier in the HD 22, or the like. While, in the present exemplary embodiment, a description is given assuming that the setting information and the like are stored in the server 102. However, it is not limited thereto, and the server 102 may refer to and use information registered on other apparatuses connected via a network.

A setting unit 804 sets communication parameters based on the setting information stored in the data storage unit 803.

A determination unit 805 determines whether to set the held setting information based on a designated identifier. Further, the determination unit 805 determines whether the communication is of the security communication, and also determines whether a setting phase can be skipped.

A communication procedure switching unit 806 switches a communication method between HTTP/1.1 communication and HTTP/2 communication.

A communication procedure skipping unit 807 skips a handshake and a setting procedure to be performed at the start of communication.

A selection unit 808 selects a protocol from HTTP/1.1 and HTTP/2.

An input unit 809 inputs an identifier such as a URI, an IP address and a port number, a Session-ID. The input unit 809 may input an identifier according to a user operation performed via a UI displayed on the input device 25, or the like, or may input an identifier acquired from another apparatus by use of NFC, Bluetooth, or the like. Further, the input unit 809 may receive an identifier stored in an application or the like therefrom and input the received identifier.

FIG. 5 is a flow chart illustrating an example of information processing to be performed when the communication apparatus 101 starts communication with the server 102.

In step S301, the input unit 209 receives an identifier from a user or an application and inputs the received identifier, and the processing proceeds to step S302. The identifier herein refers to a URI, an IP address and a port number, a Session-ID, or any other information for identifying the server 102 that is a communication partner.

In step S302, the determination unit 205 determines whether to skip processing such as handshaking, setting, and the like in communication processing based on the input identifier. The determination unit 205 checks whether the designated identifier is included in a table as illustrated in FIG. 8, and if the designated identifier is included, the determination unit 205 determines to skip the processing (YES in step S302), and the processing proceeds to step S303. On the other hand, if the designated identifier is not included in the table, the determination unit 205 determines not to skip the processing (NO in step S302), and the processing proceeds to step S312.

In step S303, the determination unit 205 checks whether the communication is of the security communication. In the present exemplary embodiment, whether the communication is of the security communication is preset associated with the identifier. However, it is not limited thereto, and the determination unit 205 may determine that the communication is of the security communication in a case where, for example, use of TLS is explicitly specified. In addition to an identifier, information indicating whether to perform TLS communication may be set associated with the identifier or included in the identifier. In the present exemplary embodiment, the term "security communication" refers to TLS and does not include security communication of other layers (e.g., Internet Protocol Security (IPsec), wireless encryption). If the determination unit 205 determines that the communication is of the security communication (YES in step S303), the processing proceeds to step S305. On the other hand, if the determination unit 205 determines that the communication is not of the security communication (NO in step S303), the processing proceeds to step S304.

In step S304, the communication unit 201 starts a TCP connection to the server 102, and the processing proceeds to step S306.

On the other hand, in step S305, the communication unit 201 starts a TLS connection to the server 102, and the processing proceeds to step S306.

In step S306, the communication procedure skipping unit 207 transmits a client connection preface to the server 102 to start HTTP/2 communication. The communication procedure skipping unit 207 has skipped a communication procedure for upgrading HTTP/1.1 to HTTP/2. The client connection preface is an example of a connection start request according to the second communication protocol.

In step S307, the determination unit 205 determines whether a message indicating the completion of reception of the client connection preface (e.g., HTTP 200 OK) is received from the server 102. If the determination unit 205 determines that a message indicating the completion of reception is received (YES in step S307), the processing proceeds to step S310. HTTP 200 OK is an example of a connection start response. On the other hand, if the determination unit 205 determines that a reception error message (e.g., Internal Server Error, HTTP Bad Request) is received (NO in step S307), the processing proceeds to step S308.

In step S308, the determination unit 205 determines whether a function to allow protocol switching during the communication is included. If the determination unit 205 determines that the function to allow protocol switching during the communication is included (YES in step S308), the processing proceeds to step S309. On the other hand, if the determination unit 205 determines that the function to allow protocol switching during the communication is not included (NO in step S308), the processing proceeds to step S316.

In step S309, the determination unit 205 disconnects the TCP or TLS connection, and then the processing proceeds to step S312.

In step S310, the setting unit 204 applies the setting information illustrated in FIG. 8, and the processing proceeds to step S311.

In step S311, the communication procedure skipping unit 207 skips a communication information setting phase that uses SETTINGS frames, and then the processing illustrated in FIG. 5 is ended.

In step S312, the determination unit 205 checks whether the communication is of the security communication. If the determination unit 205 determines that the communication is of the security communication (YES in step S312), the processing proceeds to step S313. On the other hand, if the determination unit 205 determines that the communication is not of the security communication (NO in step S312), the processing proceeds to step S315.

In step S313, the communication unit 201 starts a TLS connection to the server 102, and the processing proceeds to step S314.

In step S314, the communication procedure switching unit 206 transmits to the server 102 a protocol upgrade request using the TLS-ALPN field of a Client Hello message, and the processing proceeds to step S317.

In the case where the processing has proceeded to step S317 from step S314, in step S317, the communication procedure switching unit 206 analyzes a message contained in the ALPN field of a Server Hello message received from the server 102 and determines whether the protocol upgrade is successfully completed.

In step S315, the communication unit 201 starts a TCP connection to the server 102, and the processing proceeds to step S316.

In step S316, the communication procedure switching unit 206 transmits to the server 102 a protocol upgrade request using the HTTP Upgrade header, and the processing proceeds to step S317.

In the case where the processing has proceeded to step S317 from step S316, in step S317, the communication procedure switching unit 206 analyzes a Switching Protocols response received from the server 102 and determines whether the protocol upgrade is successfully completed.

In step S317, if the communication procedure switching unit 206 determines that the protocol upgrade is successfully completed and a HTTP/2 connection can be established (YES in step S317), the processing proceeds to step S318. On the other hand, if the communication procedure switching unit 206 determines that the protocol upgrade is not successfully completed and a HTTP/2 connection cannot be established (NO in step S317), the processing proceeds to step S321.

The processing performed in step S317 is an example of communication possibility determination processing.

In step S318, the communication procedure switching unit 206 transmits a client connection preface according to the HTTP/2 communication procedure, and the processing proceeds to step S319.

In step S319, the communication procedure switching unit 206 acquires the setting information by exchange of SETTINGS frames, and the processing proceeds to step S320. The setting information to be acquired by exchange of SETTINGS frames is, for example, the header table size, information indicating whether server push is enabled/disabled, the maximum number of streams, the initial window size, information indicating whether data compression is enabled/disabled.

In step S320, the data storage unit 203 associates the exchanged setting information with the identifier of the server 102 and stores the setting information associated with the identifier thereof, and then the processing illustrated in FIG. 5 is ended.

In step S321, the communication unit 201 starts HTTP/1.1 communication, and the processing proceeds to step S322.

In step S322, the data storage unit 203 associates, with the identifier of the server 102, information indicating that the server 102 is compatible only with HTTP/1.1 connections, and stores the information associated with the identifier of the server 102. Then, the process illustrated in FIG. 5 is ended.

FIG. 6 is a sequence diagram illustrating an example of information processing to be performed in the case where the communication setting between the communication apparatus 101 and the server 102 is skipped.

In the present exemplary embodiment, the communication apparatus 101 determines to skip the setting between the communication apparatus 101 and the server 102 depending on the designated identifier. The communication apparatus 101 and the server 102 perform TLS security communication (YES in step S302 or S303 in FIG. 5). The communication apparatus 101 acquires the identifier (session-ID) designated by the application of the communication apparatus 101. Then, the communication apparatus 101 searches the table illustrated in FIG. 8 by use of the identifier as a key, determines whether setting information is included, and if setting information corresponding to the identifier is included, the communication apparatus 101 uses the setting information.

In step M401, the communication apparatus 101 transmits a Client Hello to the server 102 (step S305 in FIG. 5).

In step M402, the server 102 transmits Server Hello to the communication apparatus 101 (step S305 in FIG. 5).

While the protocol upgrade designated in the ALPN field is omitted in steps M401 and M402 in the present exemplary embodiment, it is not limited thereto, and the protocol upgrade may be described without omission.

The communication apparatus 101 determines to start HTTP/2 communication.

In step M403, the communication apparatus 101 transmits a client connection preface to the server 102. If the server 102 determines to start HTTP/2 communication, in step M404, the server 102 transmits HTTP 200 OK to the communication apparatus 101.

Then, the communication apparatus 101 and the server 102 apply past setting information and star HTTP/2 communication.

In the present exemplary embodiment, the setting information refers to, for example, the header table size, information indicating whether server push is enabled/disabled, the maximum number of streams, the initial window size, information indicating whether data compression is enabled/disabled, and the header compression dictionary. The communication apparatus 101 and the server 102 may use a dictionary preset as a header compression dictionary or a dictionary added and/or updated by a procedure performed after the start of the communication. Further, while in the present exemplary embodiment, the description has been given assuming that the communication apparatus 101 and the server 102 apply past setting information, it is not limited thereto. For example, each of the communication apparatus 101 and the server 102 may download predetermined setting information stored in a database on other apparatuses and apply the downloaded setting information.

Figure 7:
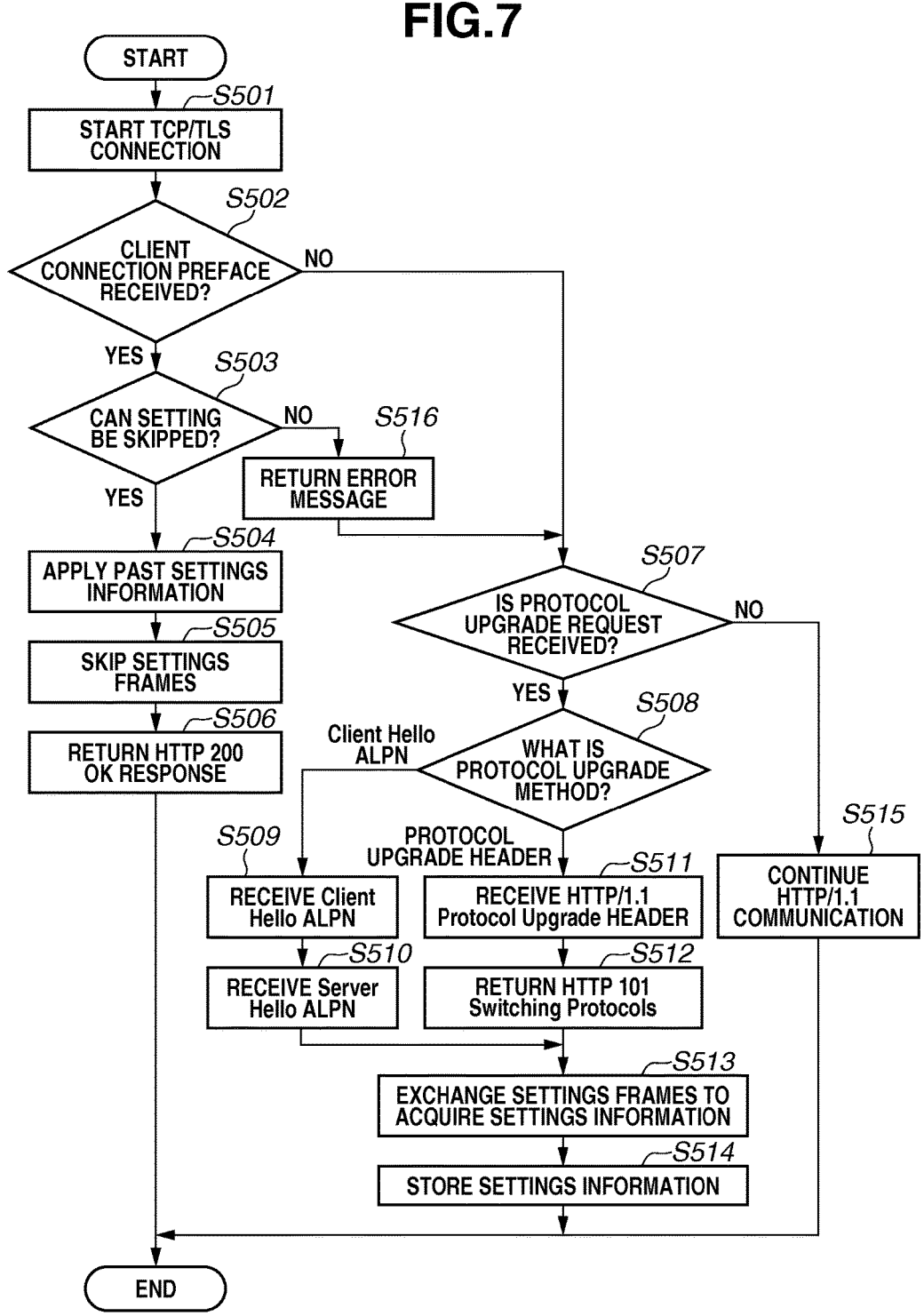
FIG. 7 is a flow chart illustrating an example of information processing to be performed when a server starts communication with a communication apparatus.

FIG. 7 is a flow chart illustrating an example of information processing to be performed when the server 102 starts communication with the communication apparatus 101.

In step S501, the communication unit 801 performs a TCP or TLS connection to the communication apparatus 101, and the processing proceeds to step S502.

In step S502, the determination unit 805 determines whether a client connection preface is received from the communication apparatus 101. If the determination unit 805 determines that a client connection preface is received (YES in step S502), the processing proceeds to step S503. On the other hand, if the determination unit 805 determines that no client connection preface is received (NO in step S502), the processing proceeds to step S507.

In step S503, the determination unit 805 performs the following determination based on whether an entry corresponding to the identifier (e.g., IP address and port number, URI, and session-ID) of the communication apparatus 101 exists in the data storage unit 803. More specifically, the determination unit 805 determines whether the communication apparatus 101 is a communication partner that the communication processing setting can be skipped thereto based on whether the entry exists. While the determination unit 805 determines whether the entry is stored in the data storage unit 803 in the present exemplary embodiment, it is not limited thereto, and the determination unit 805 may check whether the entry is stored in a database on other apparatuses connected via a network. If the entry exists, the determination unit 805 determines that the setting can be skipped (YES in step S503), and the processing proceeds to step S504. On the other hand, if the entry does not exist, the determination unit 805 determines that the setting cannot be skipped (NO in step S503), and the processing proceeds to step S516.

In step S504, the setting unit 804 applies the setting information based on the entry stored in the data storage unit 803, and the processing proceeds to step S505. While, in the present exemplary embodiment, a description is given assuming that the setting unit 804 applies the past setting information, it is not limited thereto, and predetermined setting information stored in a database on other apparatuses may be downloaded and applied.

In step S505, the communication procedure skipping unit 807 skips the communication information setting phase that uses SETTINGS frames, and the processing proceeds to step S506. While, in the present exemplary embodiment, the description has been given assuming that the communication procedure skipping unit 807 skips the entire setting phase, it is not limited thereto, and it is also possible to skip only a predetermined part of the setting phase.

In step S506, the responding unit 802 returns an HTTP 200 OK response indicating the reception of the client connection preface to the communication apparatus 101, and then the processing illustrated in FIG. 7 is ended.

In step S516, if the client is a communication partner that the setting cannot be skipped, the responding unit 802 returns an error message (Invalid method) to the communication apparatus 101, and the processing proceeds to step S507. On the other hand, in step S516, if the entry does not exist because the server 102 is turned on/off or the like, the responding unit 802 transmits an error message (Internal server error) to the communication apparatus 101, and the processing proceeds to step S507.

In step S507, the determination unit 805 determines whether a protocol upgrade request is received. If the determination unit 805 determines that a protocol upgrade request is received (YES in step S507), the processing proceeds to step S508. On the other hand, if the determination unit 805 determines that no protocol upgrade request is received (NO in step S507), the processing proceeds to step S515.

In step S508, the communication procedure switching unit 806 checks the protocol upgrade method. The communication procedure switching unit 806 determines the protocol upgrade method based on the contents or the like received from the communication apparatus 101. If the communication procedure switching unit 806 determines that the protocol upgrade using a Client Hello with the TLS-ALPN field is to be performed (Client Hello ALPN in step S508), the processing proceeds to step S509. On the other hand, if the communication procedure switching unit 806 determines that the protocol upgrade method is a switching using the HTTP/1.1 Upgrade header (Protocol Upgrade Header in step S508), the processing proceeds to step S511.

In step S509, the communication procedure switching unit 806 receives from the communication apparatus 101 a protocol upgrade request using the TLS-ALPN field of a Client Hello message, and the processing proceeds to step S510.

In step S510, the responding unit 802 returns a Server Hello with the TLS-ALPN field acknowledging the reception of the protocol upgrade to the communication apparatus 101, and the processing proceeds to step S513.

In step S511, the communication procedure switching unit 806 receives the HTTP/1.1 Upgrade header from the communication apparatus 101, and the processing proceeds to step S512.

In step S512, the responding unit 802 returns HTTP 101 Switching Protocols acknowledging the reception of the protocol upgrade to the communication apparatus 101, and the processing proceeds to step S513.

In step S513, the communication unit 201 exchanges SETTINGS frames to receive communication setting information, and the processing proceeds to step S514.

In step S514, the data storage unit 803 stores the exchanged setting information, and the processing illustrated in FIG. 7 is ended.

In step S515, on the other hand, the communication unit 201 continues the HTTP/1.1 communication, and the processing illustrated in FIG. 7 is ended.

The setting information in the communication apparatus 101 and the server 102 may be updated according to the exchange of SETTINGS frames or addition of a dictionary after the initial setting. In this way, the communication apparatus 101 and the server 102 can share the same setting information. Further, the communication apparatus 101 or the server 102 may upload the setting information to another apparatus, and at the time of reconnection, the communication apparatus 101 and the server 102 may download and use the uploaded setting information. In this way, the communication apparatus 101 and the server 102 are no longer required to store the entry, so that the use of the resource can be reduced.

FIG. 8 is a table illustrating the entry of the setting information of the communication apparatus 101.

In the present exemplary embodiment, the server identifier refers to a session-ID, an IP address and a port number, a URI, or the like. However, it is not limited thereto, and any other identifier with which the communication partner can uniquely be identified, for example, a Session Initiation Protocol (SIP) URI can be used.

Examples of the setting information include the header table size, information indicating whether server push is enabled/disabled, the maximum number of streams, the initial window size, information indicating whether data compression is enabled/disabled, the header compression dictionary, information indicating whether cipher communication is enabled/disabled. While, In the present exemplary embodiment, the description has been given assuming that only the information exchanged using SETTINGS frames is stored as the setting information, it is not limited thereto, and setting information of another layer or the like may also be used. Examples include the size of the maximum transmission unit (MTU), the TCP window size, application protocol information, and application setting information.

Although not described for the purpose of simplification of description, an entry similar to that illustrated in FIG. 8 is also stored in the server 102. In this case, the portion indicating the identifier of the server indicates the identifier of the communication apparatus 101. The identifier of the communication apparatus 101 is an example of the identification information of the communication apparatus which is the connection request source.

Figure 9:
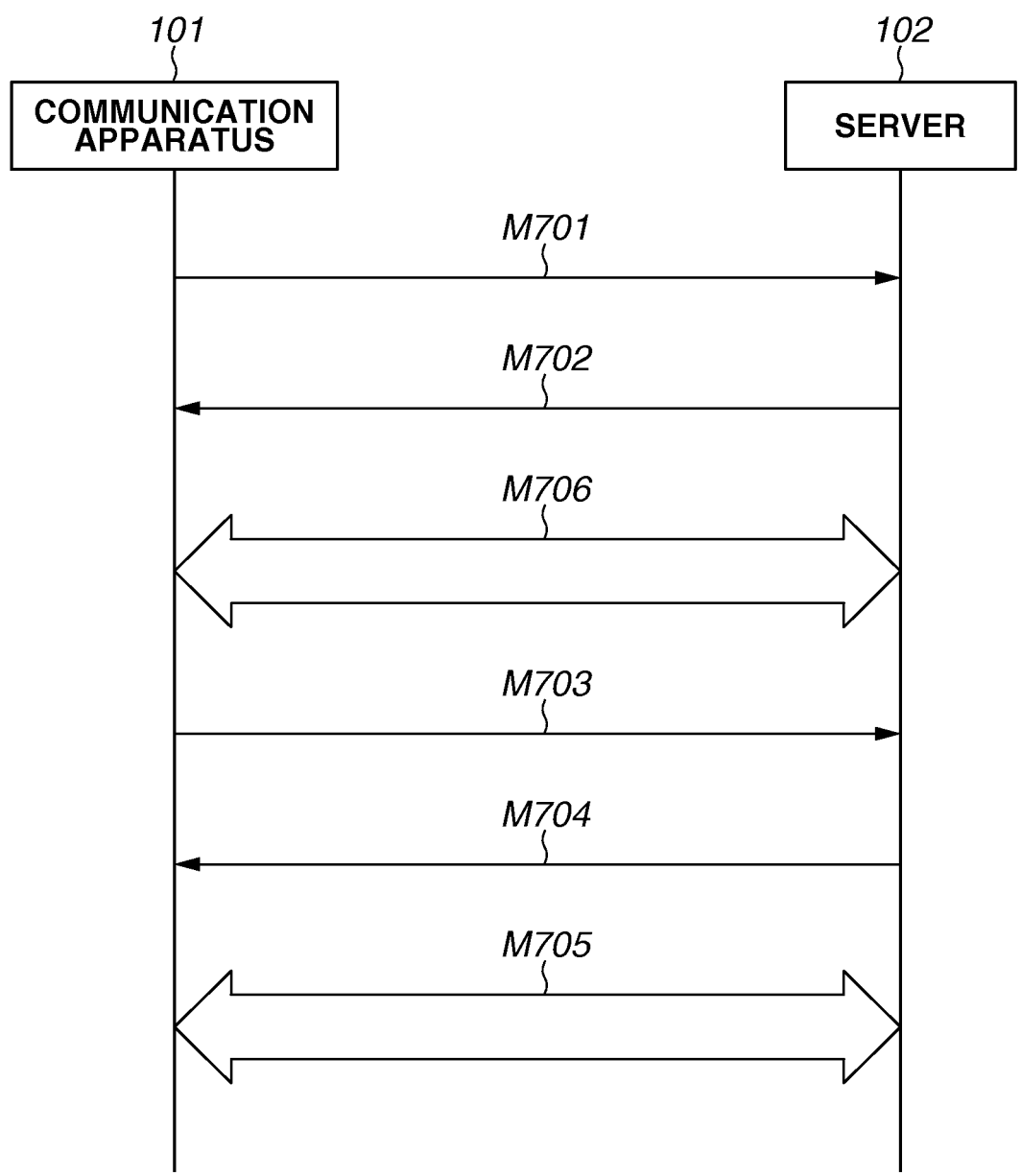
FIG. 9 is a sequence diagram illustrating an example of information processing to be performed in a case where a communication apparatus and a server change a communication method to the Hypertext Transfer Protocol version 2 (HTTP/2) communication during the Hypertext Transfer Protocol version 1.1 (HTTP/1.1) communication.

FIG. 9 is a sequence diagram illustrating an example of information processing to be performed in a case where the communication apparatus 101 and the server 102 switch a communication method to HTTP/2 communication during the HTTP/1.1 communication.

In step M701, the communication apparatus 101 performs a TCP connection to the server 102 to start HTTP/1.1 communication.

In step M702, the server 102 receives the TCP connection from the communication apparatus 101 to start HTTP/1.1 communication.

Hereinafter, in step M706, the communication apparatus 101 and the server 102 perform HTTP/1.1 communication.

The communication apparatus 101 has been using HTTP/1.1 but switches the communication method to HTTP/2 communication according to the determination by the application.

In step M703, the communication apparatus 101 transmits a HTTP/1.1 Upgrade header to the server 102 to upgrade the protocol to HTTP/2.

In step M704, when the server 102 receives the protocol upgrade from the communication apparatus 101, the server 102 returns HTTP 101 Switching Protocols.

In steps M703 and M704, the communication apparatus 101 and the server 102 determine whether to skip the communication procedure, and if the communication apparatus 101 and the server 102 determine to skip the communication procedure, then in step M705, the communication apparatus 101 and the server 102 apply the setting information and then perform HTTP/2 communication.

As described above, the processing according to the present exemplary embodiment is applicable to the protocol upgrade during the communication. In the case of HTTP/1.1 and HTTP/2, it is not possible to return the communication method to HTTP/1.1, but in a case where the protocol can be downgraded (changed), the processing for protocol switching processing can be reduced, so that waiting time can be reduced.

Further, if optimum parameters may be preset between the communication apparatus 101 and the server 102 or provided on a database for the setting information, the complicated setting processing at the start of the protocol can be reduced. For example, in a case where the communication apparatus 101 and the server 102 are embedded devices such as a camera, connection and disconnection of communication occur frequently. At that time, the above-described advantage according to the present exemplary embodiment can be expected, because the number of times the communication procedure and the parameter setting processing are performed between the communication apparatus 101 and the server 102 increases.

Other Exemplary Embodiment

An exemplary embodiment of the present invention can also be realized by processing in which a program realizing one or more functions of the above-described exemplary embodiment is supplied to a system or apparatus via a network or a storage medium, and one or more processors included in the system or the apparatus read and execute the program. Further, an exemplary embodiment of the present invention can also be realized by a circuit (e.g., application-specific integrated circuit (ASIC)) realizing one or more functions.

According to any of the above-described exemplary embodiments, the setting processing to be performed at the time of reconnection to a connection destination to which a device was connected in the past can be reduced. Further, the time until the data transmission start processing begins at the time of reconnection of the device can also be reduced. Furthermore, the time required for communication connection can be reduced.

According to configurations of the exemplary embodiments, the time required for a connection of communication can be reduced.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-197319, filed Sep. 26, 2014, which is hereby incorporated by reference herein in its entirety.

What is claimed is:

1. A communication apparatus configured to perform communication according to a first communication protocol and communication according to a second communication protocol different from the first communication protocol, the communication apparatus comprising:
    one or more memories; and
    one or more hardware processors configured to execute instructions to perform at least:
    acquiring identification information related to a communication destination;
    determining whether setting information corresponding to the acquired identification information is stored in the one or more memories, wherein the setting information is used for communication according to the second communication protocol;
    communicating with the communication destination according to the second communication protocol after performing specific communication processing according to the first communication protocol with the communication destination, based on determining that the setting information is not stored in the one or more memories; and
    communicating with the communication destination according to the second communication protocol without performing the specific communication processing according to the first communication protocol with the communication destination, based on determining that the setting information is stored in the one or more memories.

2. The communication apparatus according to claim 1, wherein the one or more hardware processors further perform:
    determining, after starting communication according to the second communication protocol without performing the specific communication processing according to the first communication protocol with the communication destination, whether communication according to the second communication protocol is possible to continue; and
    performing the specific communication processing according to the first communication protocol with the communication destination in a case where the communication according to the second communication protocol is determined not to be possible to continue.

3. The communication apparatus according to claim 1, wherein the one or more hardware processors further perform:
applying, in a case where the specific communication processing is determined not to be performed, the setting information registered with the identification information in a storage unit; and
applying, in a case where the specific communication processing is determined to be performed, setting information acquired by the specific communication processing according to the first communication protocol performed with the communication destination; wherein
communicating with the communication destination according to the second communication protocol is performed based on the applied setting information.

4. The communication apparatus according to claim 1, wherein the setting information includes information about a SETTINGS frame defined in the Hypertext Transfer Protocol version 2 (HTTP/2).

5. The communication apparatus according to claim 1, wherein the first communication protocol is the Hypertext Transfer Protocol version 1.1 (HTTP/1.1), and
wherein the second communication protocol is HTTP/2.

6. A communication system including a first communication apparatus and a second communication apparatus configured to perform communication with each other according to a first communication protocol and a second communication protocol different from the first communication protocol, the first communication apparatus comprising:
one or more memories; and
one or more hardware processors configured to execute instructions to perform at least:
acquiring identification information related to the second communication apparatus;
determining whether setting information corresponding to the acquired identification information is stored in the one or more memories, wherein the setting information is used for communication according to the second communication protocol;
communicating with the second communication apparatus according to the second communication protocol after performing specific communication processing according to the first communication protocol with the second communication apparatus, based on determining that the setting information is not stored in the one or more memories; and
communicating with the second communication apparatus according to the second communication protocol without performing the specific communication processing according to the first communication protocol with the second communication apparatus, based on determining that the setting information is stored in the one or more memories.

7. An information processing method for performing communication according to a second communication protocol different from a first communication protocol, comprising:
acquiring identification information related to a communication destination;
determining whether setting information corresponding to the acquired identification information is stored in a storage, wherein the setting information is used for communication according to the second communication protocol;
communicating with the communication destination according to the second communication protocol after performing the specific communication processing according to the first communication protocol with the communication destination, based on determining that the setting information is not stored in the storage; and
communicating with the communication destination according to the second communication protocol without performing the specific communication processing according to the first communication protocol with the communication destination, based on determining that the setting information is stored in the storage.

8. A non-transitory computer-readable storage medium storing a program for causing a computer to execute an information processing method for performing communication according to a second communication protocol different from a first communication protocol, the information processing method comprising:
acquiring identification information related to a communication destination;
determining whether setting information corresponding to the acquired identification information is stored in a storage, wherein the setting information is used for communication according to the second communication protocol;
communicating with the communication destination according to the second communication protocol after performing specific communication processing according to the first communication protocol with the communication destination, based on determining that the setting information is not stored in the one or more memories; and
communicating with the communication destination according to the second communication protocol without performing the specific communication processing according to the first communication protocol with the communication destination, based on determining that the setting information is stored in the one or more memories.

9. The communication apparatus according to claim 1, wherein the one or more hardware processors further perform storing the acquired information and setting information based on communication with the communication destination into the one or more memories.

10. The communication apparatus according to claim 1, wherein the setting information includes information about a header compression dictionary.

11. The communication apparatus according to claim 1, wherein the communication with the communication destination according to the second communication protocol is started by transmitting a connection preface defined in the Hypertext Transfer Protocol version 2 (HTTP/2).

12. The communication apparatus according to claim 1, wherein the specific communication processing according to the first communication protocol comprises at least one of transmitting and receiving setting information for communication according to the second communication protocol.

13. The communication apparatus according to claim 1, the one or more hardware processors further perform:
executing the specific communication processing in a case where the communication apparatus receives an error message from the communication destination in response to a start request for the second communication protocol transmitted, without execution of the specific communication processing, from the communication apparatus; and retransmitting the start request for the second communication protocol after executing the specific communication processing in response to the error message.

14. The communication apparatus according claim 1, the one or more hardware processors further perform:
deciding, while the communication apparatus is communicating with the communication destination according to the first communication protocol, to switch from the first communication protocol to the second communication protocol, wherein
whether to perform the specific communication processing is determined in a case where it is decided to switch from the first communication protocol to the second communication protocol.

15. The communication apparatus according claim 1, wherein the specific communication processing is not performed in a case where the setting information for communication according to the second communication processing corresponding to the acquired identification information is stored in the one or more memories.

16. The communication apparatus according claim 1, wherein the acquired identification includes at least one of URI, IP address, and port number.

17. The communication apparatus according claim 1, the one or more hardware processors further perform:
connecting with the communication destination corresponding to the acquired identification by TCP connection or TLS connection, wherein
in a case where the specific communication processing is determined to be performed, the communication apparatus starts communication with the communication destination according to the second communication protocol after performing the specific communication processing according to the first communication protocol with the connected communication destination, and
in a case where the specific communication processing is determined not to be performed, the communication apparatus starts communication with the communication destination according to the second communication protocol without performing any communication according to the first communication protocol with the connected communication destination.

* * * * *